United States Patent
Kim et al.

(10) Patent No.: US 11,310,020 B2
(45) Date of Patent: Apr. 19, 2022

(54) METHOD FOR PERFORMING CHANNEL ESTIMATION USING DMRS IN WIRELESS COMMUNICATION SYSTEM, AND APPARATUS THEREFOR

(71) Applicant: LG Electronics Inc., Seoul (KR)

(72) Inventors: Hyungtae Kim, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 16/753,223

(22) PCT Filed: Oct. 5, 2018

(86) PCT No.: PCT/KR2018/011778
§ 371 (c)(1),
(2) Date: Apr. 2, 2020

(87) PCT Pub. No.: WO2019/070105
PCT Pub. Date: Apr. 11, 2019

(65) Prior Publication Data
US 2020/0328870 A1  Oct. 15, 2020

Related U.S. Application Data

(60) Provisional application No. 62/570,587, filed on Oct. 10, 2017, provisional application No. 62/568,810, filed on Oct. 6, 2017.

(51) Int. Cl.
*H04W 72/04*  (2009.01)
*H04L 5/10*  (2006.01)
(Continued)

(52) U.S. Cl.
CPC .............. *H04L 5/10* (2013.01); *H04L 5/0051* (2013.01); *H04L 27/2605* (2013.01); *H04L 27/2613* (2013.01); *H04W 56/001* (2013.01)

(58) Field of Classification Search
CPC ....... H04L 5/10; H04L 5/0051; H04L 5/0062; H04L 5/0096; H04L 27/2605;
(Continued)

(56) References Cited

U.S. PATENT DOCUMENTS

2011/0110444 A1* 5/2011 Roh .................... H04B 7/0626
375/260
2013/0265945 A1* 10/2013 He ...................... H04L 65/4092
370/329

(Continued)

OTHER PUBLICATIONS

Samsung, On SS block/PDSCH/DMRS multiplexing, Sep. 18-21, 2017, R1-1716018, 3GPP TSG RAN WG1 Meeting NR#3 (Year: 2017).*

(Continued)

*Primary Examiner* — Hassan Kizou
*Assistant Examiner* — Mahbubul Bar Chowdhury
(74) *Attorney, Agent, or Firm* — Dentons US LLP

(57) ABSTRACT

The present disclosure provides a method for performing channel estimation using a demodulation reference signal (DMRS) in a wireless communication system. More specifically, the method, which is performed by a base station, comprises: when a collision between a DMRS symbol and a synchronization signal block (SSB) occurs, shifting a resource block (RB) of the DMRS symbol where the collision occurs, and all REs bundled with the RE of the DMRS symbol where the collision occurs; transmitting information on the shifted REs to a terminal; and transmitting the DMRS to the terminal on the shifted REs.

14 Claims, 10 Drawing Sheets

(51) Int. Cl.
  *H04L 5/00*   (2006.01)
  *H04L 27/26*  (2006.01)
  *H04W 56/00*  (2009.01)

(58) Field of Classification Search
  CPC ............. H04L 27/2613; H04L 27/2646; H04L 27/261; H04L 25/0226; H04L 25/02; H04W 56/001
  See application file for complete search history.

(56) References Cited

U.S. PATENT DOCUMENTS

| | | | |
|---|---|---|---|
| 2013/0265955 A1* | 10/2013 | Kim | H04W 72/04 |
| | | | 370/329 |
| 2014/0241150 A1* | 8/2014 | Ng | H04W 52/02 |
| | | | 370/229 |
| 2015/0109974 A1 | 4/2015 | Zeng et al. | |
| 2015/0263839 A1 | 9/2015 | He et al. | |
| 2018/0359733 A1* | 12/2018 | Bagheri | H04L 5/0051 |
| 2021/0084663 A1* | 3/2021 | Takeda | H04L 5/0051 |
| 2021/0143961 A1* | 5/2021 | Saito | H04L 5/0053 |

OTHER PUBLICATIONS

Qualcomm, Remaining issues on NR DM-RS, Aug. 21-25, 2017, R1-1715082, 3GPP TSG RAN WG1 Meeting #90 (Year: 2017).*
Texas Instruments, "Location of PSS/SSS on the New Carrier Type," R1-130096, 3GPP TSG RAN WG1 #72, St. Julian's, Malta, Jan. 19, 2013, Section 3.
Huawei, et al., "PSS/SSS Collisions with DM-RS," R1-122518, 3GPP TSG RAN WG1 Meeting #69, Prague, Czech Repbulic, May 12, 2012, Section 3.

* cited by examiner

[FIG. 1]
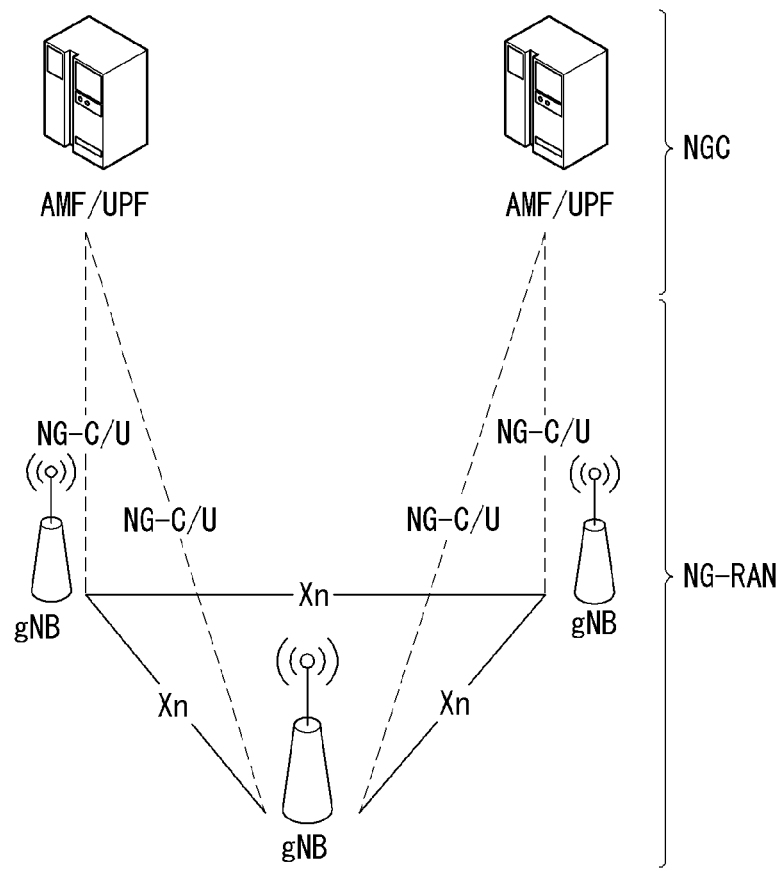
[FIG. 2]
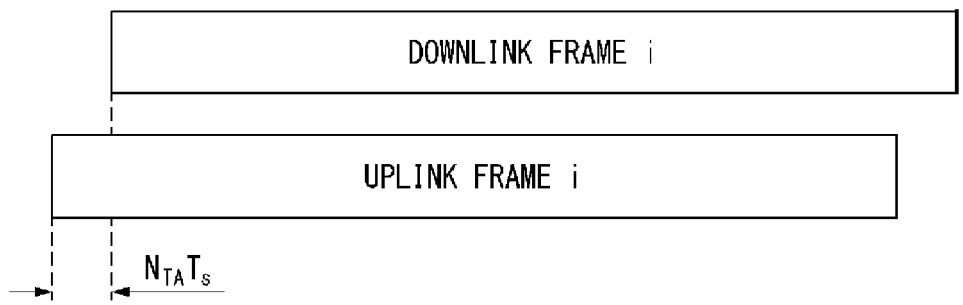

[FIG. 3]
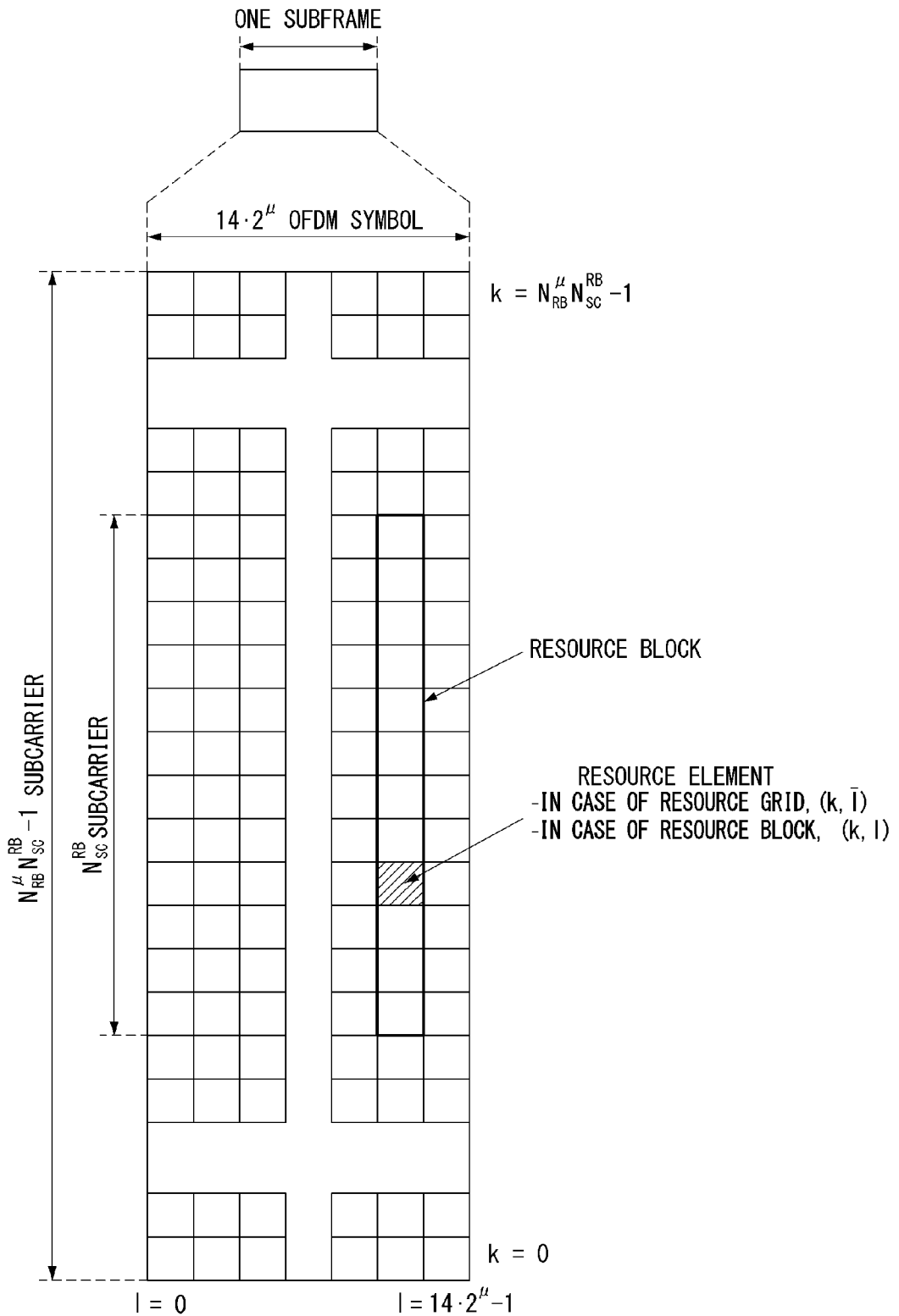

[FIG. 4]
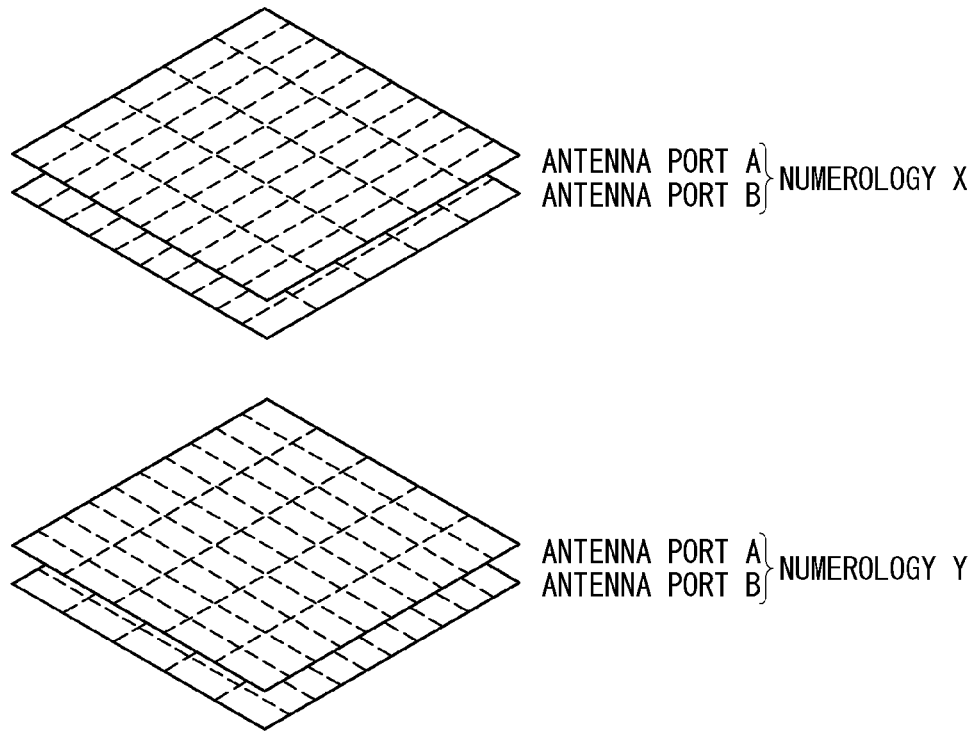
[FIG. 5]
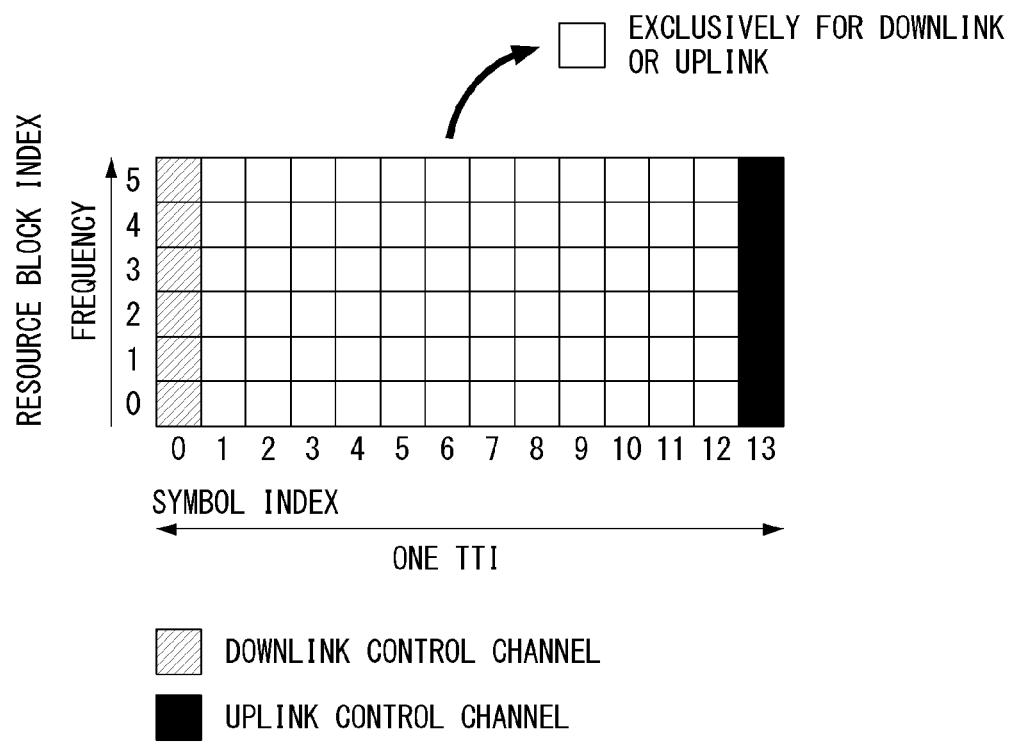

[FIG. 6]
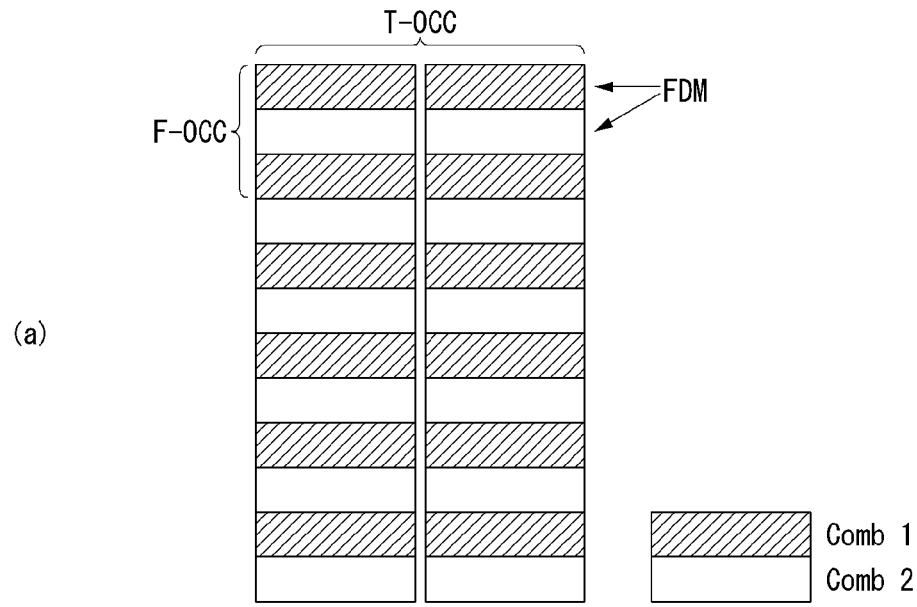
(a)
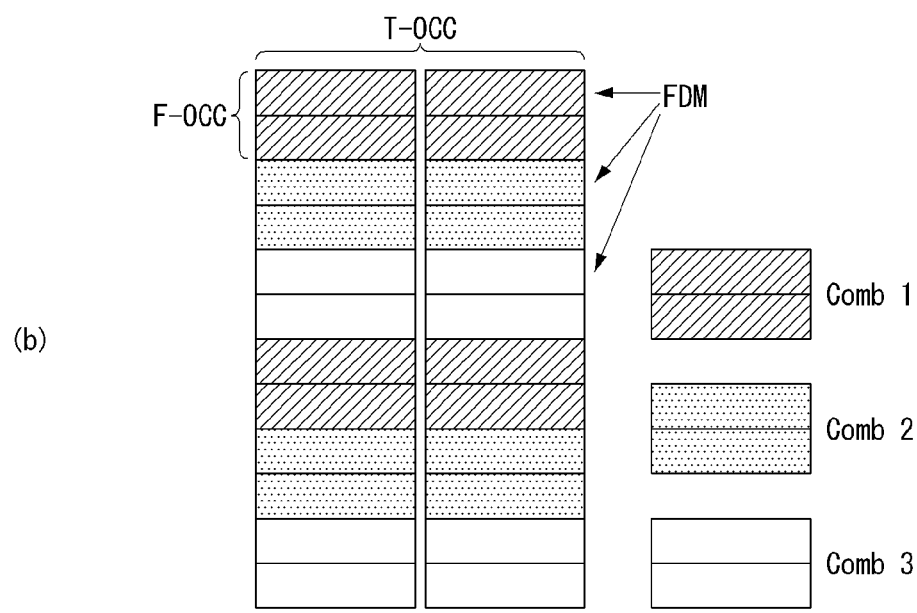
(b)

[FIG. 7]
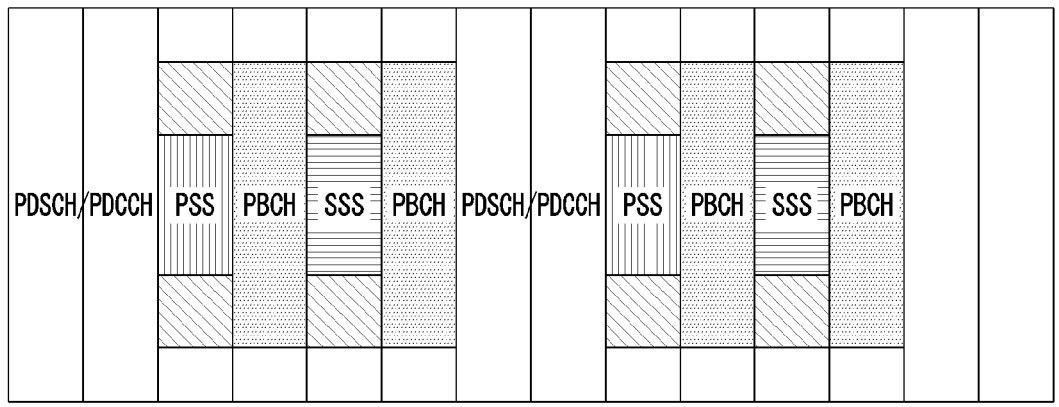
(a) No MG configured; FDM/TDM of data ans SSB
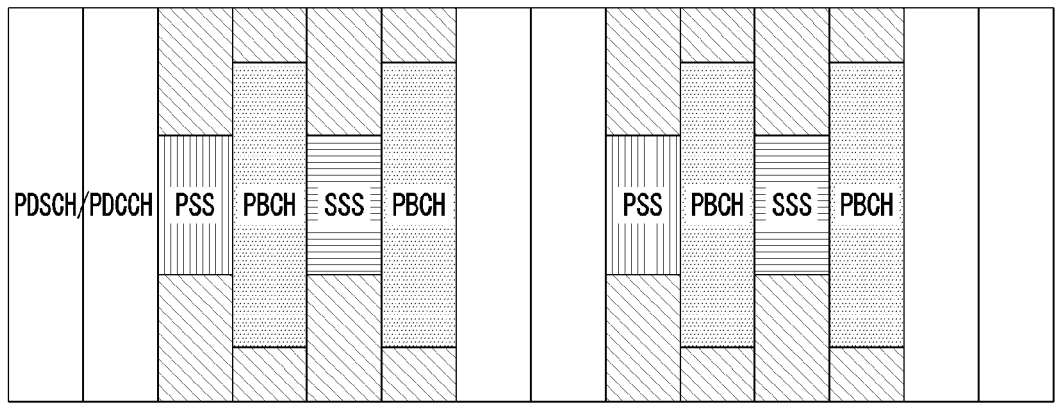
(b) No MG configured; TDM of data ans SSB
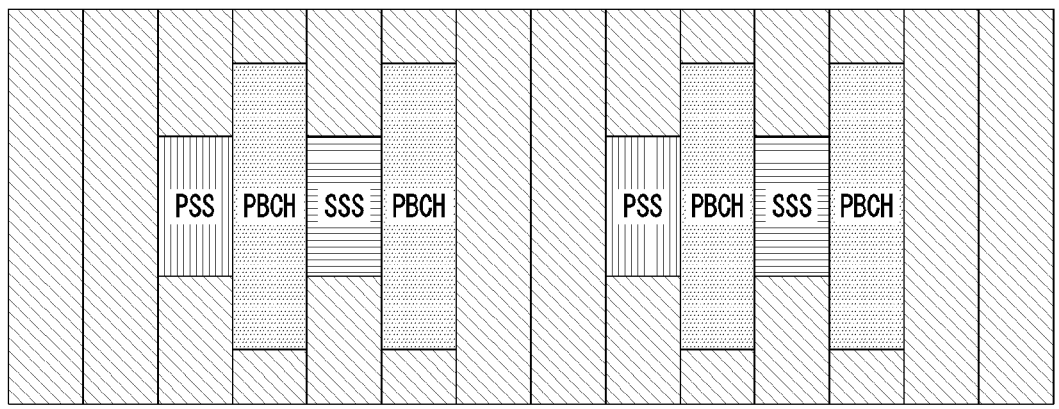
(c) MG configured

[FIG. 8]
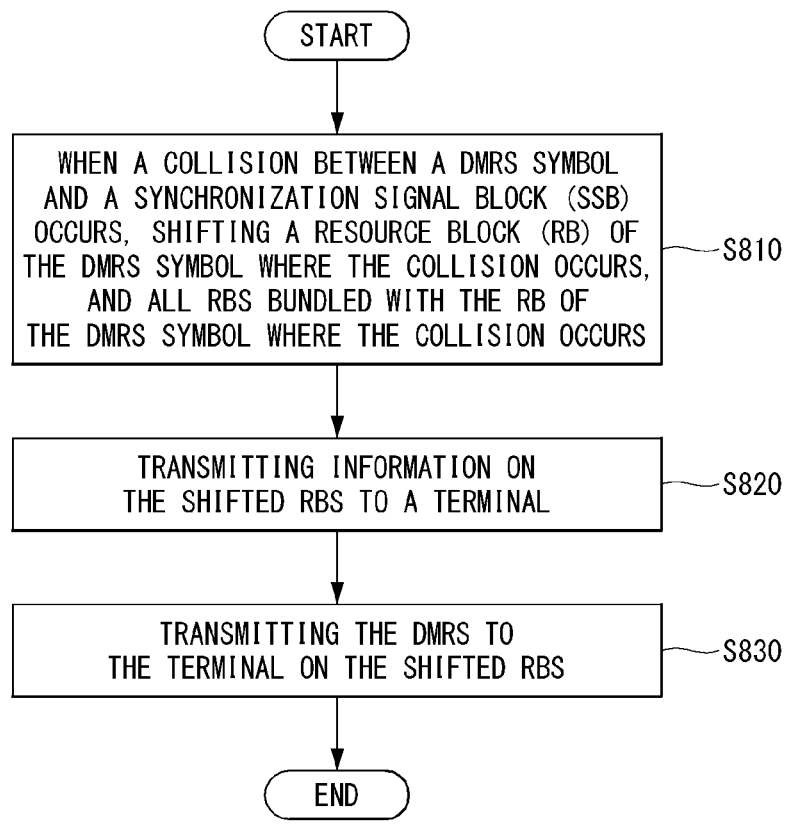

[FIG. 9]
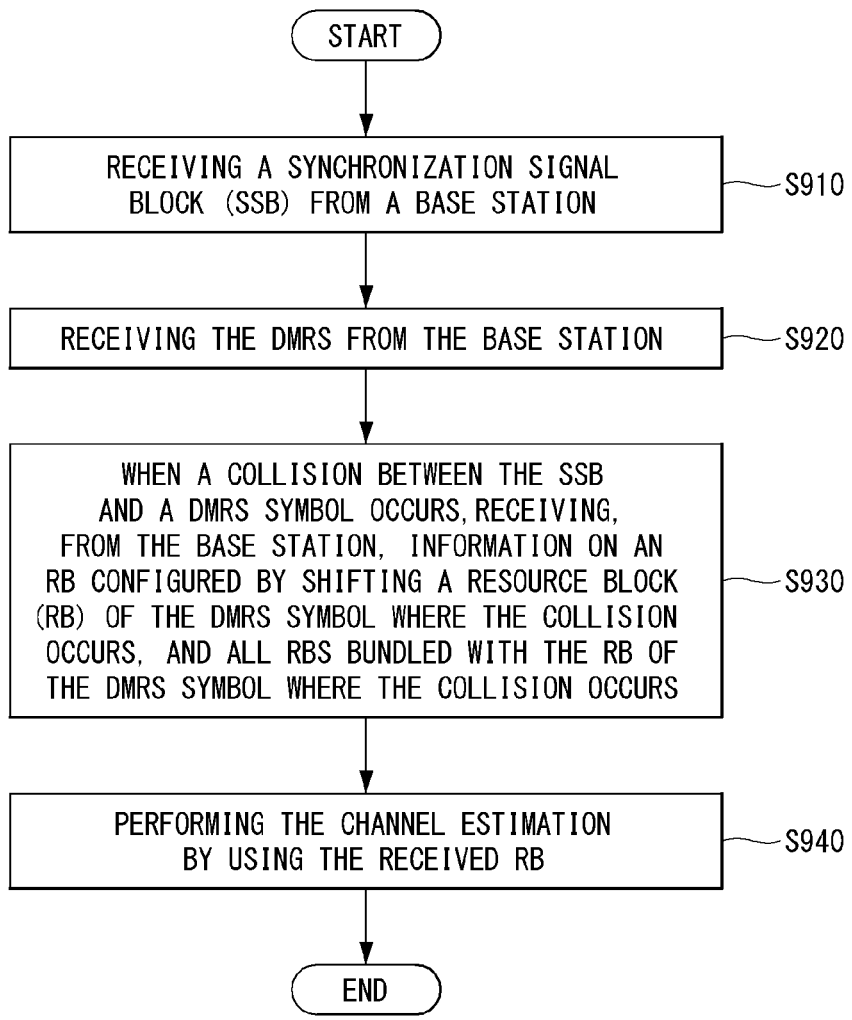
[FIG. 10]
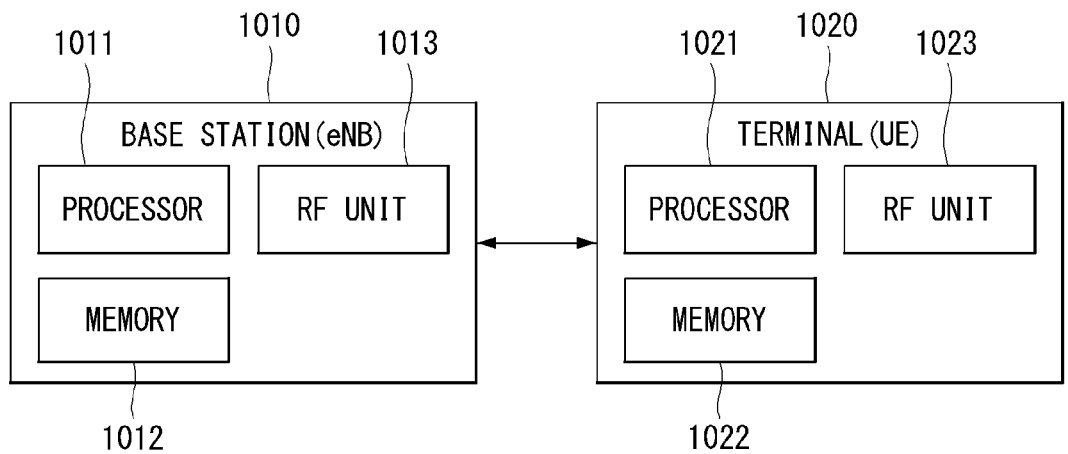

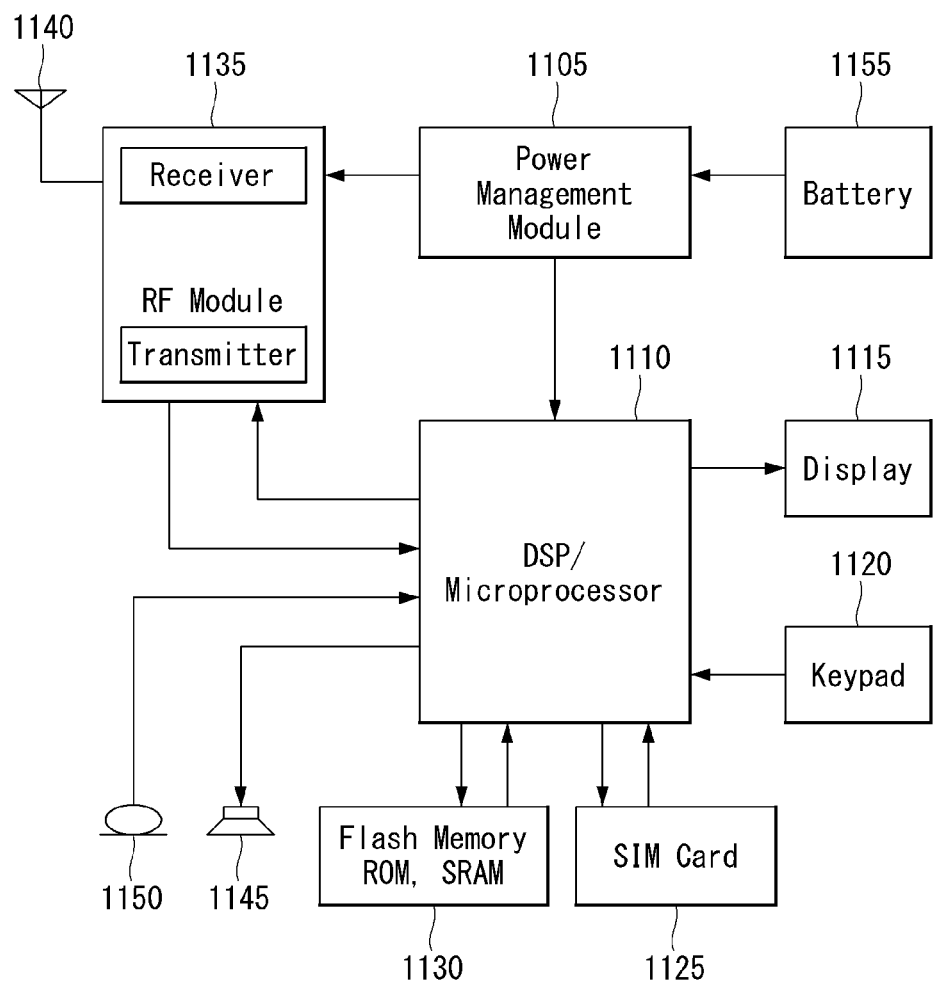
[FIG. 11]

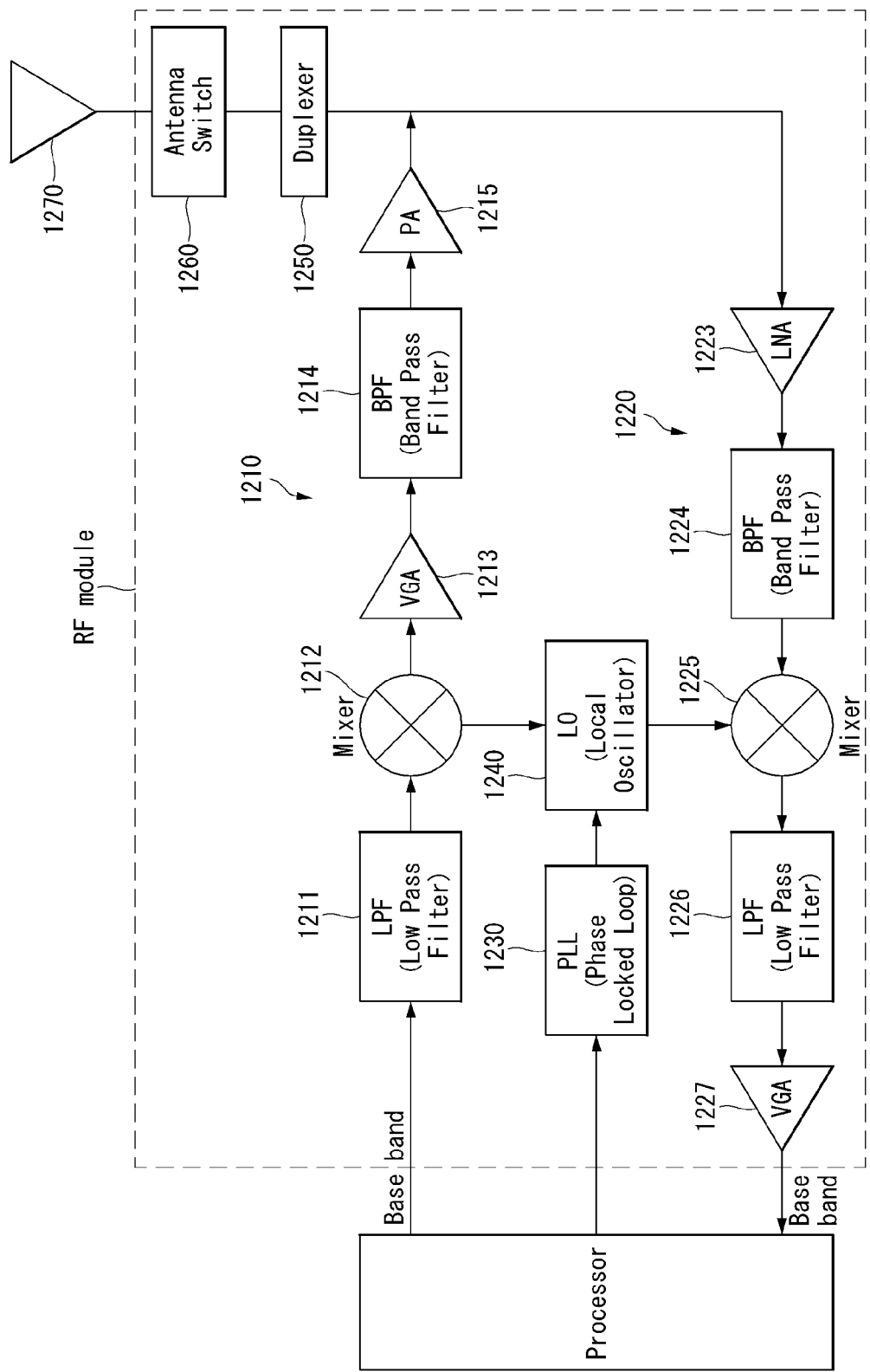
[FIG. 12]

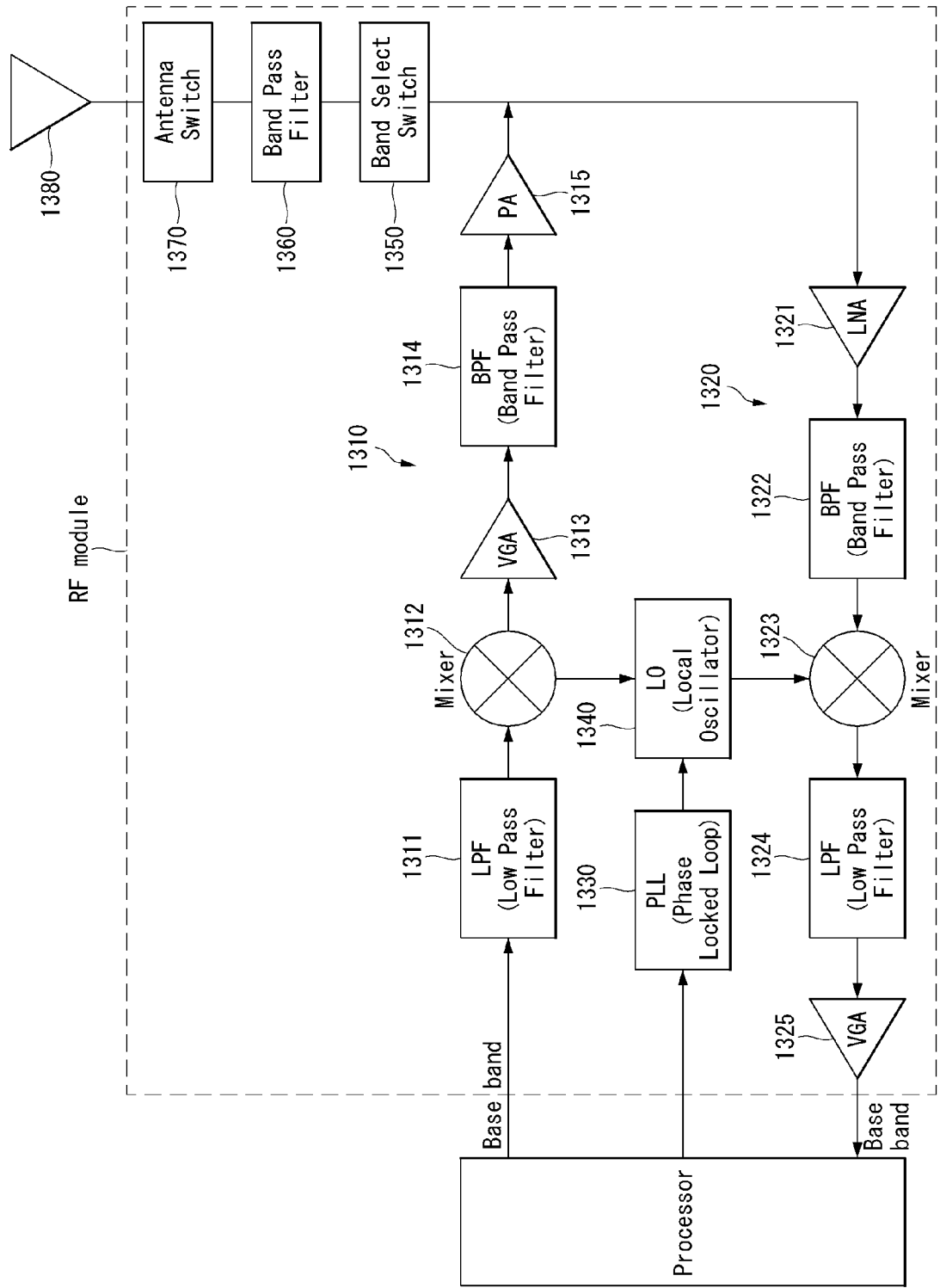
[FIG. 13]

METHOD FOR PERFORMING CHANNEL ESTIMATION USING DMRS IN WIRELESS COMMUNICATION SYSTEM, AND APPARATUS THEREFOR

This application is the National Stage filing under 35 U.S.C. 371 of International Application No. PCT/KR2018/011778, filed on Oct. 5, 2018, which claims the benefit of U.S. Provisional Application No. 62/568,810, filed on Oct. 6, 2017 and U.S. Provisional Application No. 62/570,587, filed on Oct. 10, 2017, the contents of which are all hereby incorporated by reference herein in their entirety.

TECHNICAL FIELD

The present disclosure relates to a wireless communication system, and particularly, to a method for performing channel estimation a Demodulation Reference Signal (DMRS) and an apparatus for supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure has been made in an effort to provide a method for performing channel estimation using a Demodulation Reference signal (DMRS) in a wireless communication system.

Furthermore, the present disclosure has been made in an effort to provide a method for shifting a resource block (RB) in units of bundling.

The technical objects of the present disclosure are not limited to the aforementioned technical objects, and other technical objects, which are not mentioned above, will be apparently appreciated by a person having ordinary skill in the art from the following description.

Technical Solution

In an aspect, provided is a method for performing channel estimation using a Demodulation Reference signal (DMRS) in a wireless communication system, which is performed by a base station.

Specifically, the method, which is performed by the base station includes: when a collision between a DMRS symbol and a synchronization signal block (SSB) occurs, shifting a resource block (RB) of the DMRS symbol where the collision occurs, and all REs bundled with the RE of the DMRS symbol where the collision occurs; transmitting information on the shifted REs to a terminal; and transmitting the DMRS to the terminal on the shifted REs.

Furthermore, in the present disclosure, the RB where the collision occurs and all RBs bundled with the RB where the collision occurs are shifted until the collision does not occur.

Furthermore, in the present disclosure, the RB where the collision occurs and all RBs bundled with the RB where the collision occurs are shifted in a data region.

Furthermore, in another aspect, provided is a method for performing channel estimation using a Demodulation Reference signal (DMRS) in a wireless communication system, which is performed by a terminal, including: receiving a Synchronization Signal Block (SSB) from a base station; receiving the DMRS from the base station; when a collision between the SSB and a DMRS symbol occurs, receiving, from the base station, information on an RB configured by shifting a resource block (RB) of the DMRS symbol where the collision occurs, and all RBs bundled with the RB of the DMRS symbol where the collision occurs; and performing the channel estimation by using the received RB.

Furthermore, in yet another aspect, provided is a base station for performing a method for performing channel estimation using a Demodulation Reference signal (DMRS) in a wireless communication system, including: a radio frequency (RF) module transmitting and receiving a radio signal; and a processor functionally connected with the RF module, in which the processor is configured to when a collision between a DMRS symbol and a Synchronization Signal Block (SSB) occurs, shift a resource block (RB) of the DMRS symbol where the collision occurs, and all RBs bundled with the RB of the DMRS symbol where the collision occurs, transmit information on the shifted RBs to a terminal, and transmit the DMRS to the terminal on the shifted RBs.

Furthermore, in the present disclosure, the processor shifts the RB where the collision occurs and all RBs bundled with the RB where the collision occurs are shifted until the collision does not occur.

Furthermore, in the present disclosure, the processor shifts the RB where the collision occurs and all RBs bundled with the RB where the collision occurs are shifted in a data region.

Furthermore, in still yet another aspect, provided is a terminal performing a method for performing channel estimation using a Demodulation Reference signal (DMRS) in a wireless communication system, including: a radio frequency (RF) module transmitting and receiving a radio signal; and a processor functionally connected with the RF module, in which the processor is configured to receive a Synchronization Signal Block (SSB) from a base station, receive the DMRS from the base station, when a collision between the SSB and a DMRS symbol occurs, receive, from the base station, information on an RB configured by shifting a resource block (RB) of the DMRS symbol where the collision occurs, and all RBs bundled with the RB of the DMRS symbol where the collision occurs, and perform the channel estimation by using the received RB.

Advantageous Effects

The present disclosure as a method for performing channel estimation using a Demodulation Reference Signal (DMRS) has an effect of being capable of performing channel measurement in units of bundling by shifting an RB where a collision occurs and all bundled RBs.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 1 is a diagram showing an example of a general system configuration of NR to which a method proposed in this specification may be applied.

FIG. 2 shows a relation between an uplink frame and a downlink frame in a wireless communication system to which a method proposed in this specification may be applied.

FIG. 3 shows an example of a resource grid supplied in a wireless communication system to which a method proposed in this specification may be applied.

FIG. 4 shows examples of a resource grid for each antenna port and numerology to which a method proposed in this specification may be applied.

FIG. 5 shows an example of a self-contained slot structure to which a method proposed by the present specification is applicable.

FIG. 6 is a diagram illustrating one example of a mapping pattern of a Demodulation Reference Signal to which a method proposed in the present disclosure may be applied.

FIG. 7 is a diagram illustrating an OFDM symbol location in which an SS block and a PBCH proposed in the present disclosure may be configured.

FIG. 8 is a flowchart illustrating one example of an operation method of an eNB that performs a method proposed in the present disclosure.

FIG. 9 is a flowchart illustrating one example of an operation method of a UE that performs a method proposed in the present disclosure.

FIG. 10 is a block diagram of a wireless communication device to which methods proposed in the present disclosure may be applied.

FIG. 11 is a block diagram of a communication device according to an embodiment of the present disclosure.

FIG. 12 is a diagram illustrating one example of an RF module of a wireless communication device to which a method proposed in the present disclosure may be applied.

FIG. 13 is a diagram illustrating another example of an RF module of a wireless communication device to which a method proposed in the present disclosure may be applied.

MODE FOR INVENTION

Reference will now be made in detail to embodiments of the invention, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

General System

FIG. 1 illustrates an example of an overall structure of a NR system to which a method proposed by the present specification is applicable.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

FIG. 2 illustrates a relation between an uplink frame and a downlink frame in a wireless communication system to which a method proposed by the present specification is applicable.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | | | Slot configuration | | |
| | | | | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
|---|---|---|---|---|---|---|
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

Slot configuration

| | 0 | | | 1 | | |
|---|---|---|---|---|---|---|
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10  | 1  | 6 | 20 | 2 |
| 1 | 12 | 20  | 2  | 6 | 40 | 4 |
| 2 | 12 | 40  | 4  | 6 | 80 | 8 |
| 3 | 12 | 80  | 8  | — | —  | — |
| 4 | 12 | 160 | 16 | — | —  | — |
| 5 | 12 | 320 | 32 | — | —  | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of Delay spread, Doppler spread, Frequency shift, Average received power, and Received Timing.

FIG. 3 illustrates an example of a resource grid supported in a wireless communication system to which a method proposed by the present specification is applicable.

Referring to FIG. 3, a resource grid is composed of $N_{RB}^{\mu} N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 4, one resource grid may be configured per the numerology μ and an antenna port p.

FIG. 4 illustrates examples of a resource grid per antenna port and numerology to which a method proposed by the present specification is applicable.

Each element of the resource grid for the numerology μ and the antenna port p is indicated as a resource element, and may be uniquely identified by an index pair (k,l̄). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l̄) is used, where $l=0, \ldots, N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Hereinafter, prior to specifically describing the methods proposed in the present disclosure, a description will be briefly made of the contents directly or indirectly related to the methods proposed in the present disclosure.

In the next-generation communication such as 5G and New Rat (NR), as more communication devices require a larger communication capacity, a need for an improved mobile broadband communication is emerging compared to a conventional radio access technology (RAT).

In addition, massive MTC (Machine Type Communications), which provides a variety of services anytime, anywhere by connecting multiple devices and objects, is also one of the major issues to be considered in next-generation communication.

In addition, the design or structure of a communication system considering a service and/or a terminal (UE) sensitive to reliability and latency is being discussed.

As such, the introduction of next-generation radio access technology (RAT) in consideration of enhanced mobile broadband (eMBB) communication, massive MTC (mMTC), and Ultra-Reliable and Low Latency Communication (URLLC) is currently being discussed. For convenience, the technology will be collectively referred to as 'new RAT (NR)'.

Self-Contained Slot Structure

That is, FIG. 5 illustrates an example of a self-contained slot structure to which a method proposed by the present specification is applicable.

In order to minimize data transmission latency in a TDD system, a 5 generation (5G) new RAT considers a self-contained subframe structure as shown in FIG. 5.

In FIG. 5, a diagonal line area (symbol index 0) represents a UL control area, and a black area (symbol index 13) represents a UL control area. A nonshade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (Cal), and the like correspond to the information.

Here, the RI represents rank information of a channel, which means the number of streams received by the UE through the same time-frequency resource. Since this value is determined depending on the long term fading of the channel, the value is fed back from the UE to the eNB with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the eNB uses the PMI.

In the 3GPP LTE/LTE-A system, the eNB configures a plurality of CSI processes to the UE and may receive CSI for each process. Here, the CSI process is constituted by a CSI-RS for signal quality measurement from the eNB and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the eNB is possible only to a small number of UEs in the corresponding direction. Therefore, if necessary, the analog beam direction is differently configured for each antenna port so that data transmission can be simultaneously performed to a plurality of UEs in several analog beam directions.

FIG. 6 is a diagram illustrating one example of a mapping pattern of a Demodulation Reference Signal to which a method proposed in the present disclosure may be applied.

Referring to FIG. 6, a Demodulation Reference Signal for demodulation of data in NR may be classified into type 1 or type 2 according to a mapping form and may be mapped to one or two symbols.

Specifically, in the NR, the Demodulation Reference Signal may be classified into a Front load DMRS and an additional DMRS. The Front load DMRS may be positioned at a front symbol of a slot for fast decoding and may occupy one or two symbols indicated by Downlink Control Information (DCI) or RRC.

In the case of slot based scheduling, in the Front load DMRS, a first DMRS symbol is positioned in a third or fourth symbol indicated by a Physical Broadcast Channel (PBCH) which is a broadcast channel.

In the case of non-slot based scheduling, in the Front load DMRS, the first DMRS symbol is positioned in a first symbol of PDSCH/PUSCH.

In the case of a fast UE, the additional DMRS may be configured and is positioned around a middle/last symbol of the slot.

The additional DMRS may occupy 0, 1, 2, or 3 symbols which are equally spread when the front load DMRS is configured in one symbol and occupy 0 or 2 symbols when the front load DMRS is configured in two symbols.

The front load DMRS may have two mapping types (type 1 and type 2) as illustrated in FIGS. 6(a) and 6(b) and may be mapped according to a type indicated by the RRC between two mapping types.

Hereinafter, (a) will be referred to as type 1 and (b) will be referred to as type 2.

Both type 1 and type 2 may be mapped to one or two symbols.

When the DMRS is mapped to one symbol in type 1 as illustrated in FIG. 6(a), Frequency-Code Division Multiplexing (F-CDM) and Frequency Division Multiplexing (FDM) having a length of 2 may be used on a frequency axis in order to multiplex a maximum of four antenna ports and when the additional DMRS is not configured, an RS density of each antenna port is 6 REs per resource block (RB).

When the DMRS is mapped to two symbols in type 1, the F-CDM and the FDM having the length of 2 may be used on the frequency axis in order to multiplex a maximum of eight antenna ports may be used and T-CDM having the length of 2 may be used on a time axis.

When the additional DMRS is not configured, the RS density of each antenna port is 8 REs per resource block (RB).

When the DMRS is mapped to one symbol in type 2 as illustrated in FIG. 6(b), the Frequency-Code Division Multiplexing (F-CDM) and Frequency Division Multiplexing (FDM) having the length of 2 may be used on the frequency axis in order to multiplex a maximum of six antenna ports and when the additional DMRS is not configured, the RS density of each antenna port is 4 REs per resource block (RB).

When the DMRS is mapped to two symbols in type 2, the F-CDM and the FDM having the length of 2 may be used on the frequency axis in order to multiplex a maximum of twelve antenna ports may be used and T-CDM having the length of 2 may be used on the time axis.

When the additional DMRS is not configured, the RS density of each antenna port is 8 REs per resource block (RB).

In order to avoid transmitting both a Demodulation reference signal (DMRS) OFDM symbol (hereinafter, referred to as a DMRS symbol) and SS/PBCH in the same resource element (hereinafter, referred to as collision avoidance), the DMRS may not be transmitted and the SS/Synchronization Signal/Physical Broadcast Channel (PBCH) may be transmitted with a priority.

If an additional DMRS symbol collides with the SS/PBCH, the DMRS may not be transmitted and the SS/PBCH may be transmitted with the priority.

While the additional DMRS is used as an auxiliary means to increase channel estimation accuracy, the front load DMRS as a DMRS which is continuously present is particularly required for channel estimation, and as a result, it is proposed that the collision for the front load DMRS is solved by a different scheme.

In other words, if the front load DMRS symbol collides with the SS/PBCH, the DMRS is transmitted with the priority and the SS/PBCH is not transmitted.

Further, in this case, the DMRS is transmitted in another OFDM symbol in which the SS/PBCH is not transmitted (this is referred to as a DMRS symbol shift).

As illustrated in FIG. 7(a), the SS/PBCH and data/Physical downlink control channel (PDCCH) may be subjected to Frequency Division Multiplexing (FDM).

In this case, if the DMRS is shifted only in a resource block (RB) transmitting the SS/PBCH, a problem related to Physical Resource Block (PRB) bundling occurs.

For example, there may be a case where data is transmitted in RBs 0, 1, and 2, the SS is transmitted in RB 3, and the front load DMRS is configured in a third OFDM symbol.

In this case, the front load DMRS is shifted to another available symbol in RB 3 and the DMRS is still transmitted to the third OFDM symbol in RBs 0, 1, and 2.

In this case, if the PRB bundling is configured to 4 or more, bundling may not be applied to RBs 0, 1, 2, and 3 any longer.

The reason is that a location of the DMRS symbol in a bundled RB is changed, and as a result, an effective channel estimated by a DMRS port is significantly changed between RB 2 and RB 3.

Accordingly, hereinafter, the present disclosure proposes several methods for solving the problem.

Method 1

Method 1 is a method for equally shifting the DMRS symbol to all RBs bundled in the same bundling unit.

In other words, in the above example, since RBs 0, 1, and 2 do not collide with each other, but the DMRS of RB 3 bundled by bundling is shifted, RBs 0, 1, and 2 are also shifted to the same location.

As a result, a user equipment (UE) may perform channel estimation in units of bundling.

Therefore, there is an advantage in that since the channel estimation may be performed in units of bundling, the channel estimation may be more effectively performed.

However, the DMRS shift is not performed in a PRB bundle constituted only by an RB in which the DMRS shift does not occur.

Method 2

Method 2 is a method in which even for the RBs bundled in the same bundling unit, when a shifted DMRS symbol and a non-shift DMRS symbol are mixed, the UE ignores bundling of the corresponding RB.

However, bundling may be applied between adjacent RBs constituted only by the non-shift DMRS symbol among RBs bundled in units of bundling.

Further, similarly (at the same location), bundling may be applied between adjacent RBs with the shift DMRS symbol.

In other words, in the above example, bundling may be applied to RBs 0, 1, and 2 and RB 3 may perform channel estimation alone.

Method 3

Method 3 is a method in which the UE performs the channel estimation by applying the bundling only to DMRSs having the DMRS symbol location (of continuous RBs) eve for RBs that are bundled in the same bundling unit.

For example, in the above example, there may be a case where two DMRS symbols are configured in RBs 0, 1, 2, and 3, the DMRS is transmitted third and seventh symbols in RBs 0, 1, and 2 and a third symbol DMRS where the collision occurs is shifted to a k-th symbol in RB 3, and a seventh symbol where the collision does not occur is transmitted as it is.

In this case, the bundling may be applied to the seventh symbol in RBs 0, 1, 2, and 3 and the bundling may be applied to the DMRS of the third symbol in RBs 0, 1, and 2, and the bundling may not be applied to the DMRS of the k-th symbol in RB 3.

Methods 1 to 3 described above may also be applied to a case where the DMRS is shifted due to another predetermined channel other than the SS/PBCH.

For example, in a non slot based data transmission mode (i.e., means data scheduling of a mini slot constituted by less than 14 OFDM symbols), the DMRS shift may occur due to PDCCH transmission in some RBs which are present in one PRB bundle.

For example, one PRB bundle is configured in RBs 0, 1, 2, and 3 and only data may be transmitted to PRBs 0, 1, and 2 without the PDCCH, but the PDCCH may be transmitted in PRB 3.

In this case, in PRBs 0, 1, and 2, the DMRS may be transmitted to the first OFDM symbol, but in PRB 3, the PDCCH is transmitted to the first OFDM symbol, and as a result, the DMRS shift occurs.

In this case, one of Methods 1, 2, and 3 is applied.

When Method 1 is applied, the DMRS shift applied RB 3 may be equally applied even in RBs 0, 1, and 2 constituting the same PRB bundle.

If the DMRS shift does not occur in all RBs which are present in one PRB bundle, the DMRS shift is not applied.

Next, the method for performing channel estimation using a DMRS proposed in the present disclosure will be described in more detail with reference to the accompanying drawings (FIGS. 8 and 9).

FIG. 8 is a flowchart illustrating one example of an operation method of an eNB that performs channel estimation using a DMRS proposed in the present disclosure.

First, it is checked whether the collision between the DMRS symbol and the SSB occurs and when the collision occurs, all RBs bundled with the RB of the DMRS symbol are shifted (S810).

In addition, information on the shifted RBs is transmitted to the UE (S820).

Thereafter, the DMRS is transmitted to the UE on the shifted RBs (S830).

In other words, there is an effect in that by shifting all RBs bundled with the RB where the collision occurs, the channel estimation may be effectively performed while maintaining a bundling state.

FIG. 9 is a flowchart illustrating one example of an operation method of an eNB that performs channel estimation using a DMRS proposed in the present disclosure.

The UE receives the SSB from the eNB and receives (S910 and S920).

Thereafter, when the collision between the SSB and the DMRS symbol occurs, information on the RB of shifting all RBs bundled with the RB of the DMRS symbol where the collision occurs is received from the eNB (S930).

In this case, the shifted RB may be achieved through step S810.

Thereafter, the UE performs the channel estimation based on the shifted RB information (S940).

Here, the DMRS in step S920 may be a DMRS transmitted on the shifted RB.

Overview of Devices to which Present Disclosure is Applicable

FIG. 10 is a block diagram of a wireless communication device to which methods proposed in the present disclosure may be applied.

Referring to FIG. 10, a wireless communication system includes an eNB 1010 and multiple UEs 1010 positioned within an area of the eNB 1020.

Each of the eNB and the UE may be expressed as a wireless device.

The eNB 1010 includes a processor 1011, a memory 1012, and a radio frequency (RF) module 1013.

The processor 1011 implements a function, a process, and/or a method which are proposed in FIGS. 1 to 9 above.

Layers of a radio interface protocol may be implemented by the processor.

The memory 1012 is connected with the processor to store various information for driving the processor.

The RF module 1013 is connected with the processor to transmit and/or receive a radio signal.

The UE 1020 includes a processor 1021, a memory 1022, and an RF module 1023.

The processor 1021 implements a function, a process, and/or a method which are proposed in FIGS. 1 to 9 above. Layers of a radio interface protocol may be implemented by the processor. The memory 1022 is connected with the processor to store various information for driving the processor. The RF module 1023 is connected with the processor to transmit and/or receive a radio signal.

The memories 1012 and 1022 may be positioned inside or outside the processors 1011 and 1021 and connected with the processors 1011 and 1021 by various well-known means.

Further, the eNB 1010 and/or the UE 1020 may have a single antenna or multiple antennas.

FIG. 11 is a block diagram of a communication device according to an embodiment of the present disclosure.

In particular, FIG. 11 is a diagram more specifically illustrating the UE of FIG. 10 above.

Referring to FIG. 11, the UE may be configured to include a processor (or a digital signal processor (DSP)) 1110, an RF module (or RF unit) 1135, a power management module 1105, an antenna 1140, a battery 1155, a display 1115, a keypad 1120, a memory 1130, a subscriber identification module (SIM) card 1125 (this component is optional), a speaker 1145, and a microphone 1150. The UE may also include a single antenna or multiple antennas.

The processor 1110 implements a function, a process, and/or a method which are proposed in FIGS. 1 to 9 above. The layers of the radio interface protocol may be implemented by the processor.

The memory 1130 is connected with the processor and stores information related with an operation of the processor. The memory may be positioned inside or outside the processor and connected with the processor by various well-known means.

A user inputs command information such as a telephone number or the like by, for example, pressing (or touching) a button on the keypad 1120 or by voice activation using the microphone 1150. The processor receives such command information and processes to perform appropriate functions including dialing a telephone number. Operational data may be extracted from the SIM card 1125 or the memory. In addition, the processor may display command information or drive information on the display 1115 for the user to recognize and for convenience.

The RF module 1135 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1140 functions to transmit and receive the wireless signals. Upon receiving the radio signals, the RF module may transfer the signal for processing by the processor and convert the signal to a baseband. The processed signal may be converted into to audible or readable information output via the speaker 1145.

FIG. 12 is a diagram illustrating one example of an RF module of a wireless communication device to which a method proposed in the present disclosure may be applied.

Specifically, FIG. 12 illustrates an example of an RF module that may be implemented in a frequency division duplex (FDD) system.

First, in a transmission path, the processors described in FIGS. 10 and 11 process the data to be transmitted and provide an analog output signal to the transmitter 1210.

Within the transmitter 1210, the analog output signal is filtered by a low pass filter (LPF) 1211 to remove images caused by a digital-to-analog conversion (ADC) and up-converted to an RF from a baseband by an up-converter (mixer) 1212, and amplified by a variable gain amplifier (VGA) 1213 and the amplified signal is filtered by a filter 1214, additionally amplified by a power amplifier (PA) 1215, routed through a duplexer(s) 1250/an antenna switch(es) 1260, and transmitted through an antenna 1270.

In addition, in a reception path, the antenna 1270 receives signals from the outside and provides the received signals, which are routed through the antenna switch(es) 1260/duplexers 1250 and provided to a receiver 1220.

In the receiver 1220, the received signals are amplified by a low noise amplifier (LNA) 1223, filtered by a bans pass filter 1224, and down-converted from the RF to the baseband by a down-converter (mixer) 1225.

The down-converted signal is filtered by a low pass filter (LPF) 1226 and amplified by a VGA 1127 to obtain an analog input signal, which is provided to the processors described in FIGS. 10 and 11.

Further, a local oscillator (LO) generator 1240 also provides transmitted and received LO signals to the up-converter 1212 and the down-converter 1225, respectively.

In addition, a phase locked loop (PLL) 1230 receives control information from the processor to generate the transmitted and received LO signals at appropriate frequencies and provides control signals to the LO generator 1240.

Further, circuits illustrated in FIG. 12 may be arranged differently from the components illustrated in FIG. 12.

FIG. 13 is a diagram illustrating yet another example of the RF module of the wireless communication device to which a method proposed by the present disclosure can be applied.

Specifically, FIG. 13 illustrates an example of an RF module that may be implemented in a time division duplex (TDD) system.

A transmitter 1310 and a receiver 1320 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 12.

A signal amplified by a power amplifier (PA) 1315 of the transmitter is routed through a band select switch 1350, a band pass filter (BPF) 1360, and an antenna switch(es) 1370 and transmitted via an antenna 1380.

In addition, in a reception path, the antenna 1380 receives signals from the outside and provides the received signals, which are routed through the antenna switch(es) 1370, the band pass filter 1360, and the band select switch 1350 and provided to the receiver 1320.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It will be apparent that some claims referring to specific claims may be combined with another claims referring to the other claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative, but should be construed as being illustrative from all aspects. The scope of the present disclosure should be determined by reasonable analysis of the attached claims, and all changes within the equivalent range of the present disclosure are included in the scope of the present disclosure.

INDUSTRIAL APPLICABILITY

Although a scheme of performing measurement in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method for transmitting a Demodulation Reference signal (DMRS) in a wireless communication system, the method performed by a base station and comprising:
   transmitting, to a terminal, a configuration for resource block (RB) bundling,
   wherein an RB bundling unit comprises a plurality of RBs in the frequency domain,
   wherein a first RB included in the RB bundling unit is allocated for a specific signal and a second RB included in the RB bundling unit is allocated for a data channel,
   wherein, for the first RB, a DMRS collides with the specific signal at a first symbol in the time domain, the DMRS is shifted to a second symbol based on the collision,
   wherein, for the second RB, a symbol location of a DMRS for the data channel, where there is no collision, is shifted based on a location of the second symbol;
   transmitting, to the terminal, information on the shifted symbol location of the DMRS for the data channel; and
   transmitting, to the terminal, the DMRS for the data channel on the shifted symbol location.

2. The method of claim 1, wherein the DMRS on the first symbol is shifted until the collision does not occur.

3. The method of claim 1, wherein the specific signal is a Synchronization Signal Block (SSB).

4. The method of claim 3, wherein the DMRS on the first symbol is a front-loaded DMRS.

5. The method of claim 4, wherein for the first RB, (i) an additional DMRS collides with the specific signal at a third symbol in the time domain, and (ii) based on the collision between the additional DMRS and the specific signal, the additional DMRS on the third symbol is dropped.

6. The method of claim 1, wherein the specific signal is received on a physical downlink control channel (PDCCH).

7. A method for receiving a Demodulation Reference signal (DMRS) in a wireless communication system, the method performed by a terminal and comprising:
   receiving, from a base station, a configuration for resource block (RB) bundling,
   wherein an RB bundling unit comprises a plurality of RBs in the frequency domain,
   wherein a first RB included in the RB bundling unit is allocated for a specific signal and a second RB included in the RB bundling unit is allocated for a data channel,
   wherein, for the first RB, a DMRS collides with the specific signal at a first symbol in the time domain, the DMRS is shifted to a second symbol based on the collision, and
   wherein, for the second RB, a symbol location of a DMRS for the data channel, where there is no collision, is shifted based on a location of the second symbol,
   receiving, from the base station, information on the shifted symbol location of the DMRS for the data channel; and
   receiving, from the base station, the DMRS for the data channel on the shifted symbol location; and
   performing a channel estimation using the received DMRS for the data channel.

8. The method of claim 7, wherein the specific signal is a Synchronization Signal Block (SSB).

9. The method of claim 8, wherein the DMRS on the first symbol is a front-loaded DMRS.

10. The method of claim 9, wherein for the first RB, (i) an additional DMRS collides with the specific signal at a third symbol in the time domain, and (ii) based on the collision between the additional DMRS and the specific signal, the additional DMRS on the third symbol is dropped.

11. The method of claim 7, wherein the specific signal is received on a physical downlink control channel (PDCCH).

12. A base station configured for transmitting a Demodulation Reference signal (DMRS) in a wireless communication system, the base station comprising:
   a radio frequency (RF) transceiver transmitting and receiving a radio signal; and
   a processor functionally connected with the RF transceiver,
   wherein the processor is configured to:
   transmit, to a terminal, a configuration for resource block (RB) bundling,
   wherein an RB bundling unit comprises a plurality of RBs in the frequency domain,
   wherein a first RB included in the RB bundling unit is allocated for a specific signal and a second RB included in the RB bundling unit is allocated for a data channel,
   wherein, for the first RB, a DMRS collides with the specific signal at a first symbol in the time domain, the DMRS is shifted to a second symbol based on the collision, and
   wherein, for the second RB, a symbol location of a DMRS for the data channel, where there is no collision, is shifted based on a location of the second symbol, transmit, to the terminal, information on the shifted symbol location of the DMRS for the data channel, and transmit, to the terminal, the DMRS for the data channel on the shifted symbol location.

13. The base station of claim 12, wherein the DMRS on the first symbol is shifted until the collision does not occur.

14. A terminal configured for receiving a Demodulation Reference signal (DMRS) in a wireless communication system, the terminal comprising:
- a radio frequency (RF) transceiver transmitting and receiving a radio signal; and
- a processor functionally connected with the RF transceiver, wherein the processor is configured to:
receive, from a base station, a configuration for resource block (RB) bundling, wherein an RB bundling unit comprises a plurality of RBs in the frequency domain, wherein a first RB included in the RB bundling unit is allocated for a specific signal and a second RB included in the RB bundling unit is allocated for a data channel, wherein, for the first RB, a DMRS collides with the specific signal at a first symbol in the time domain, the DMRS is shifted to a second symbol based on the collision, and wherein, for the second RB, a symbol location of a DMRS for the data channel, where there is no collision, is shifted based on a location of the second symbol, receive, from the base station, information on the shifted symbol location of the DMRS for the data channel, receive, from the base station, the DMRS for the data channel on the shifted symbol location, and perform a channel estimation using the received DMRS for the data channel.

* * * * *